US012429291B2

(12) United States Patent
Mohana et al.

(10) Patent No.: US 12,429,291 B2
(45) Date of Patent: Sep. 30, 2025

(54) THERMAL ENERGY STORAGE CONCEPT WITH HIGH ENERGY STORAGE DENSITY

(71) Applicant: Nederlandse Organisatie voor toegepast-natuurwetenschappelijk onderzoek TNO, 's-Gravenhage (NL)

(72) Inventors: Martin Mohana, Delft (NL); Pavol Bodis, Hoofddorp (NL); Laurens Daniel Van Vliet, 's-Gravenhage (NL); Ruud Cuypers, Rijswijk (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 81 days.

(21) Appl. No.: 17/797,383

(22) PCT Filed: Feb. 10, 2021

(86) PCT No.: PCT/NL2021/050088
§ 371 (c)(1),
(2) Date: Aug. 3, 2022

(87) PCT Pub. No.: WO2021/162549
PCT Pub. Date: Aug. 19, 2021

(65) Prior Publication Data
US 2023/0056787 A1    Feb. 23, 2023

(30) Foreign Application Priority Data
Feb. 10, 2020    (EP) ..................... 20156418

(51) Int. Cl.
*F28D 20/00*    (2006.01)
*F24D 11/00*    (2022.01)
(Continued)

(52) U.S. Cl.
CPC ........ *F28D 20/0056* (2013.01); *F24D 11/004* (2013.01); *F24D 17/0031* (2013.01);
(Continued)

(58) Field of Classification Search
CPC ................ F28F 2013/008; F24H 7/002; F28D 20/0034; F28D 20/0056; F28D 2020/0082
See application file for complete search history.

(56) References Cited

U.S. PATENT DOCUMENTS 2,902,266 A * 9/1959 Isham ...................... F25D 3/00
165/104.19
3,823,305 A * 7/1974 Schroder ................ F28D 20/02
126/400
(Continued)

FOREIGN PATENT DOCUMENTS

CA        2702463 A1    10/2011
DE    102013003357 A1 *  8/2014   ......... B60H 1/00492
(Continued)

*Primary Examiner* — Eric S Ruppert
(74) *Attorney, Agent, or Firm* — Banner & Witcoff, Ltd.

(57) ABSTRACT

The invention relates to a sensible heat storage apparatus that comprises a core material that can be heated to a high temperature while it has been placed in a heat transfer fluid that absorbs essentially all the heat that is lost by any heat leakages from the core material. Accordingly, there is a very low, or almost absent overall heat loss, even though the sensible heat storage apparatus can store heat at a very high temperature. The gist of the invention is further that the high amount of heat can gradually be transferred to the HTF, which heat can in turn be put to use for domestic applications (e.g. domestic hot water and/or space heating) or for steam generation.

15 Claims, 4 Drawing Sheets

Figure 1:
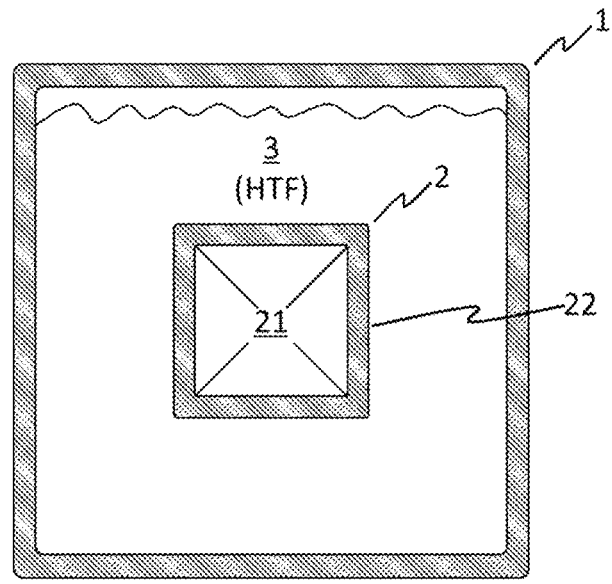

(51) Int. Cl.
*F24D 17/00* (2022.01)
*F24H 1/20* (2022.01)
*F24H 7/02* (2022.01)
*F28D 20/02* (2006.01)
*F28F 13/00* (2006.01)

(52) U.S. Cl.
CPC .......... *F24H 1/201* (2013.01); *F24H 7/0241* (2013.01); *F28D 20/0034* (2013.01); *F28D 20/02* (2013.01); *F24D 2220/10* (2013.01); *F28D 2020/0082* (2013.01); *F28F 2013/008* (2013.01)

(56) References Cited

U.S. PATENT DOCUMENTS

| | | | |
|---|---|---|---|
| 2005/0150226 A1* | 7/2005 | Perkins | F24H 15/37 60/645 |
| 2011/0120669 A1 | 5/2011 | Hunt | |
| 2014/0144919 A1 | 5/2014 | Al-Dhafiri | |
| 2017/0306798 A1* | 10/2017 | Cave | F01K 7/16 |

FOREIGN PATENT DOCUMENTS

| | | | | |
|---|---|---|---|---|
| EP | 3104099 A1 * | 12/2016 | ............ | E04B 1/803 |
| EP | 3121522 A1 | 1/2017 | | |
| JP | 2016217664 A | 12/2016 | | |

* cited by examiner

THERMAL ENERGY STORAGE CONCEPT WITH HIGH ENERGY STORAGE DENSITY

RELATED APPLICATIONS

This application is a National Stage Application under 35 U.S.C. 371 of PCT application PCT/NL2021/050088 designating the United States and filed Feb. 10, 2021; which claims the benefit of EP Application Serial No. 20156418.4 and filed Feb. 10, 2020, each of which are hereby incorporated by reference in their entireties.

The invention is in the field of energy storage and conversion. The invention is in particular directed to an apparatus for electrical and thermal energy storage and conversion and its use in hot water and/or heating provisions.

The supply of alternative energy sources such as solar, wind and hydro-powered energy generally depends on the amount of available sunlight, wind, water etc. As such, these alternative energy sources are associated with fluctuating supplies and as society moves from fossil-fuel based energy supplies to alternative energy sources, the need for energy storage systems to accommodate these fluctuating supplies and to cover mismatch between supply and demand is becoming more and more pronounced, both in industry and on the level of households or neighborhoods.

Several systems for energy storage on the level of households or neighborhoods have been proposed (see also Sarbu and Sebarchievici, Sustainability 10 (2018) 191, 1-32). An energy storage and heating system for use in i.a. electric vehicles and buildings is described in for instance DE102013003357. Examples of energy storage devices include hot water tanks (boiler technology), lithium-ion batteries and thermochemical energy storage devices. A particular challenge in this field is to achieve a high energy storage density with a minimal loss of energy during prolonged storage, in particular with sensible heat storage apparatus. In sensible heat storage, heat is stored in material using the intrinsic heat capacity (Cp) of the material. In contrast to thermochemical energy storage and latent heat storage (see e.g. EP3121522), the material does typically not undergo a chemical and/or phase change.

Another system is described in CA2702463, which discloses heat driven self-circulating fluid heating and storage tanks having double walls.

An example of a water tank is described in US 2014/0144919, wherein an outer tank and a plurality of inner tanks are present with insulation gaps between adjacent tanks. However, the purpose of this water tank is to maintain water at moderate temperature.

With hot water tank technology, which is a particular example of sensible heat storage, it is typically possible to achieve an energy storage density of about 0.1 to 0.15 GJ/m$^3$ on system level, using typical loading and unloading temperatures. Theoretically, a maximum of about 0.3 GJ/m$^3$ is possible. In such hot water tank solutions, the energy storage density is generally limited by the maximum temperature of the water before it starts boiling, which limits the minimal dimensions of the tanks. However, even if the maximum temperature would be higher, the stored energy would reduce over time due to inevitable losses due to the temperature difference between the environment and the stored heat.

Sensible heat storage does have the advantage over thermochemical heat storage and latent heat storage that it allows for relatively simple systems as no multiphase physics, complex kinetics etc. are involved. This results in a longer lifetime of the storage system, thereby increasing the number of charge and discharge cycles and in effect decreasing the cost of stored energy. It is desired to provide a sensible heat storage apparatus that does not suffer from one or more of the above-mentioned drawbacks of conventional heat storage apparatus.

The present inventors have surprisingly found that the above can be achieved by providing a sensible heat storage apparatus that comprises a core material that can be heated to a high temperature while it has been placed in a heat transfer fluid that absorbs essentially all the heat that is lost by heat leakages from the core material. Accordingly, there is a minimal, or almost absent overall heat loss, even though the sensible heat storage apparatus can store heat at a very high temperature. The gist of the invention is further that the high amount of heat can gradually be transferred to the HTF, which heat can in turn be put to use, for instance for domestic applications (e.g. domestic hot water and/or space heating) or for steam generation. Thanks to reaching very high temperatures in the core material, the storage density of the present storage apparatus is significantly higher than the contemporary solutions with insulated hot water tanks. The concept advantageously utilized the fact that heat losses through the inner wall, are captured in the HTF, limiting the total losses to the ambient.

Accordingly, in a first aspect, the present invention is directed to a sensible heat storage apparatus comprising
  a heat transfer fluid (HTF) tank (1) adapted to comprise an HTF (3) such as water; and
  a core container (2) that is adapted to be at least partially submerged in the HTF when the HTF is present within said HTF tank; wherein said core container is adapted to be at least partially filled with a core material (21) and which comprises an inner thermal insulation wall (22) defining an internal volume of the core container adapted to contain said core material.

When the sensible heat storage apparatus is not installed and/or not operational, it may not contain the HTF and/or the core material for during storage, easier transportation and/or installation. When the apparatus is in use or operational, it thus comprises
  the heat transfer fluid (HTF) tank (1) comprising the HTF (3) such as water; and
  the core container (2) that is at least partially submerged in the HTF;
which core container is at least partially filled with a core material (21) and which comprises an inner thermal insulation wall (22) that at least partially surrounds said core material. For the sake of conciseness and clarity, the apparatus is herein further described as if it were in operation, i.e. charged with HTF and the core material.

In case the core container is surrounded by HTF, this is also to be understood as submerged in the context of the present invention. In addition, the core container may be partially submerged for certain functions of the system only (e.g. when partially charged), since it may be that for other functions (e.g. prolonged storage when charged) it is preferred that the core container is temporary not submerged in the HTF. The term 'partially submerged' herein thus i.a. means that the system is adapted such that the core container can be submerged in the HTF within the HTF tank and that when the HTF tank is filled with HTF, the core container is at least partially submerged in the HTF.

The heat storage apparatus may comprise only one core container or a multitude of core containers that are each individually at least partially submerged in the HTF. Moreover, the core container as well as the HTF tank can independently have a variety of shapes (e.g. cylindrical, cubic and the like), depending on the required heat transfer properties to and from the HTF.

In FIG. 1, a particular embodiment of the present invention is illustrated.

Figure 2:
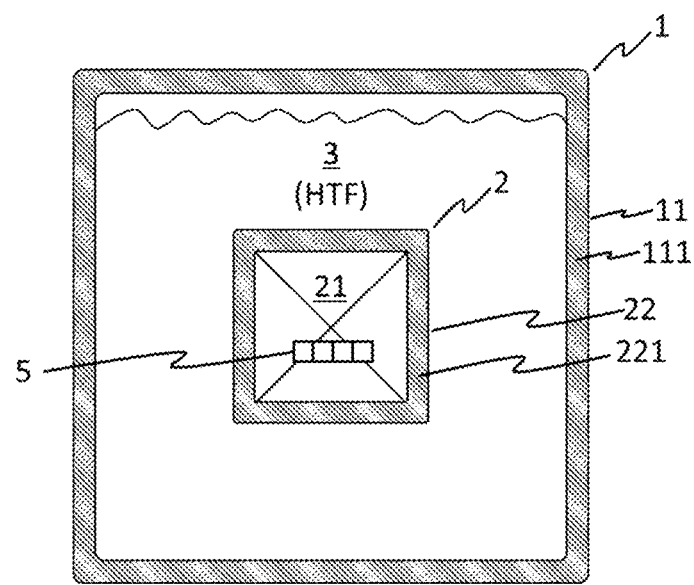
Figure 3:
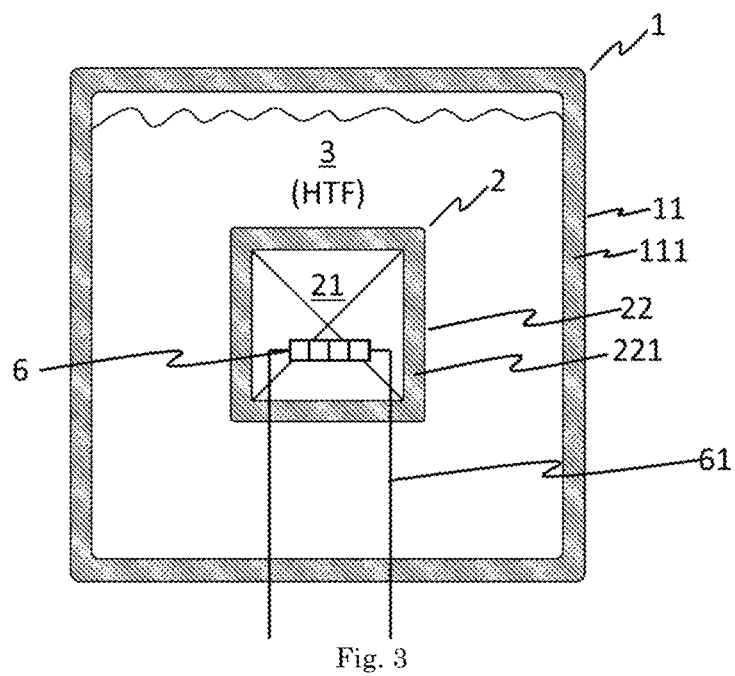
Figure 4:
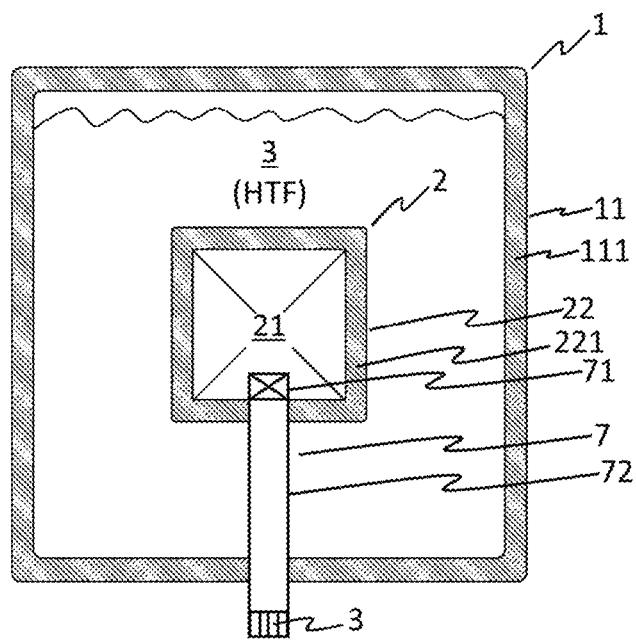

In FIGS. 2-4, particular embodiments with various heaters are illustrated. The embodiments also comprise particular inner thermal insulation walls.

Figure 5:
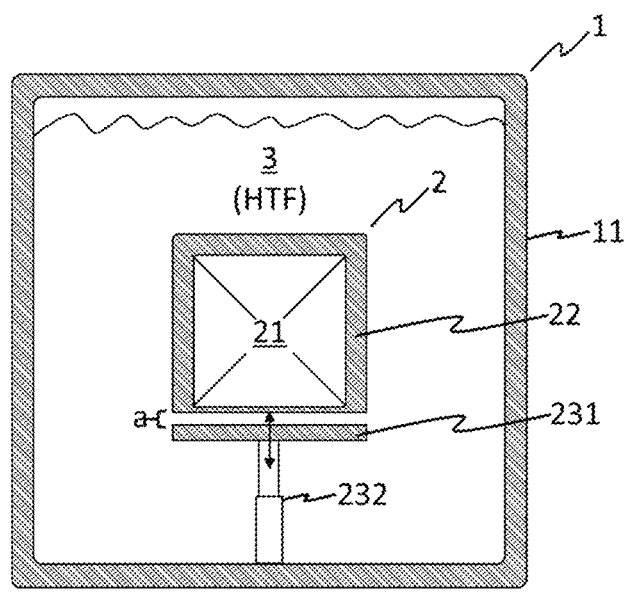
Figure 6:
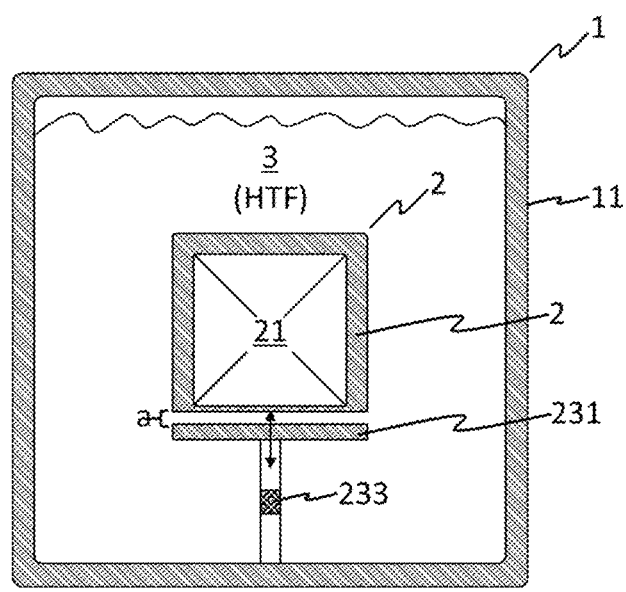

In FIGS. 5 and 6, embodiments with other particular inner thermal insulation walls are illustrated.

Figure 7A:
Figure 7B:
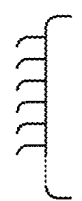
Figure 7C:

In FIGS. 7A-7C, examples of inner wall structures according to the invention are illustrated.

Figure 8:
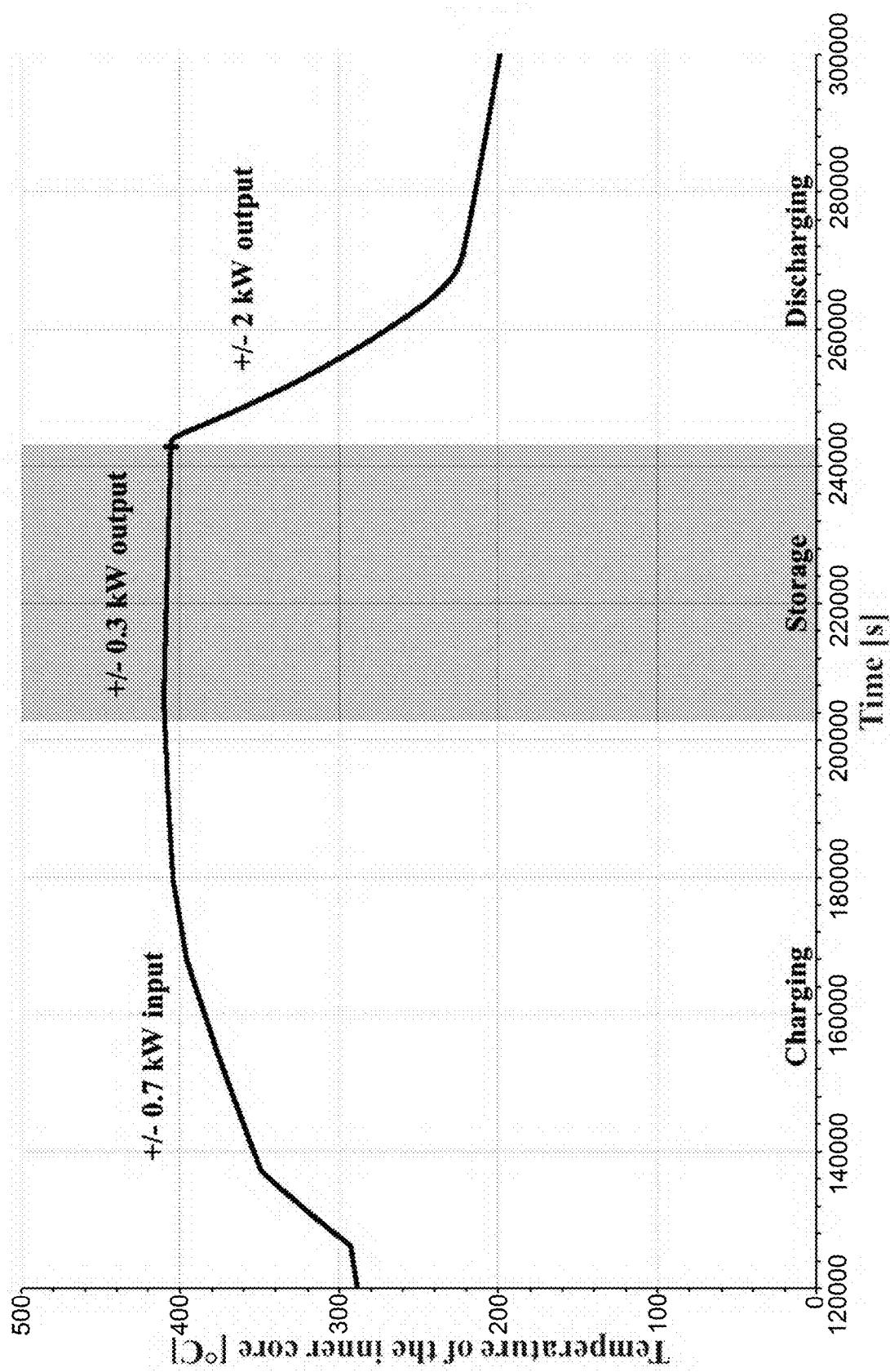

In FIG. 8, the temperature of an inner container comprising a core material during charging, storage and discharging is illustrated, as well as the input power during charging and the output power during storage and discharging for a preferred embodiment of the present invention.

The inner thermal insulation wall (22) (herein also referred to as the inner wall) that at least partially surrounds said core material i.a. serves to thermally insulate the core material from the HTF in the HTF. This limits heat transfer from the core material to the HFT and prevents overheating from the HTF. This general embodiment is illustrated in FIG. 1.

To charge the apparatus with heat, the core material can be heated with a heater. Accordingly, the apparatus preferably comprises a heater (5) as illustrated in FIG. 2. The heater can be based on electrical heating with a resistive element, including inductive heating, on plasma (which is particularly favorable to deliver high temperature), on a fluidic interphase such as a heat exchanger or a heat pipe, and the like. The invention is not particularly limited to a certain type of heating, but it is preferred to limit the thermal exposure of the core material to its environment, i.e. it is preferable to minimally disrupt the continuity of the inner wall (e.g. by penetration of equipment such as tubing and/or wiring) that is insulating the core material from the HTF. Accordingly, the smaller profile (e.g. cross-section surface area) of the means required to provide the energy to heat up the core material is, the better. Therefore, electrical heating is particularly preferred as this generally only requires some electrical wiring to the core material or it may even be based on inductive heating for which no penetration of the inner wall might be required at all.

In FIG. 3, a particular embodiment comprising an electrical heater (6) is illustrated. The profile of the electrical wiring (61) is generally much smaller than means that are required to transfer energy in for instance a heat pipe (7, as illustrated in FIG. 4). The principle technology behind heat pipes is known from heat collectors on roof and can be based on a heating section (73) that is connected to a condensing section (71), e.g. by one or more pipes (72). The heating section (73) in the heat pipe can heat and evaporate a heat transfer fluid (which may be the same or an entirely different type of heat transfer fluid than that HTF (3) comprised in the HTF tank (1)) which can transfer to the condensing section that is placed in the core container such that the heat transfer fluid and the condensation thereof can heat the core material.

In particular preferred embodiments, the heater is adapted to heat the core material to a temperature of more than 100° C., preferably more than 150° C., more preferably more than 500° C., more preferred more than 800° C. such as in the range in 900° C. or 1000° C. Even higher temperatures may however also be possible. In generally, the higher temperature to which the heater can heat the core material, the more energy can be stored in the apparatus. The maximum temperature however will typically be limited by the melting point of the inner wall, which in case of stainless steel may limit the maximum temperature to which the core can be heated to about 1000° C. It is possible that by heating the core material during operating of the apparatus, at least part of the core material itself may melt. In such case, additional heat can be stored by an at least partially material phase change of the core material and the apparatus can accordingly be considered to be a sensible and latent heat storage apparatus. The term 'sensible heat storage apparatus' as used herein may thus include apparatuses suitable for sensible and latent heat storage. In general, whether the core material can melt during the operation will depend on the type of the material and the maximum temperature to which the core material can be heated.

The core material is in principle not necessarily limited to any type of material. However, it preferably does have a high volumetric heat capacity, high heat conductivity, low thermal expansion and/or high boiling point. The melting point at the other hand does not necessarily have to be high and may be low, as long as the boiling point remains high. A high volumetric heat capacity, i.e. a volumetric heat capacity of at least 1.5 MJ/K/m$^3$, preferably at least 2 MJ/K/ma, more preferably at least 5 MJ/K/ma, enables a high energy storage density. This is in particular the case if the melting and/or boiling points are high (e.g. a melting point of more than 100° C., preferably more than 500° C., more preferred more than 800° C. is preferred for the core material) such that the core material allows for a high difference between its minimal and maximal temperature when operating the apparatus.

A high heat conductivity, e.g. of at least 50 W/m/K, preferably at least 200 W/m/K, more preferably at least 300 W/m/K, is advantageous for an efficient heat transfer of the core material to the HTF, without requiring the presence of additional heat transfer means which would take up space in the apparatus that could otherwise be occupied by the core material itself or which may be economically undesirable and complex (e.g. such as copper). To maintain a high heat conductivity, it is preferred to limit or prevent any gases or open spaces entrained within the core container as this may be detrimental to the overall heat conductivity. Inter alia for this reason, it is also preferred that the core material has a low thermal expansion coefficient, or at least that it is well-matched with the thermal expansion coefficient of the inner wall. As described-above, the core material is contained by the inner wall. If during use of the apparatus, the core material would expand more than the inner wall, it may exhort undesirable amounts of pressures to the inner wall, resulting in material stress and reduced lifetime of the apparatus. Accordingly, the core material preferably has a thermal expansion coefficient of less than $50 \times 10^{-6}$ m/(m-K), preferably less than $20 \times 10^{-6}$ m/(m·K). At the other hand, if the thermal expansion coefficient of the inner wall is much larger than that of the core material, voids may be formed (which may or may not eventually be filled with gases such as air or HTF vapor), which can reduce the overall efficiency of the heat transfer of the core material to the HTF. Accordingly, the ratio of the thermal expansion coefficients of the core material and the inner thermal insulation wall is preferably within the range of 0.25 to 4, more preferably in the range of 0.5 to 2, most preferably about 1.

The core material can comprise a single material or a composition of materials. Suitable materials on which the core material can be based include materials selected from the group consisting of metals, metal alloys, metal oxides, metal nitrides, metal carbides, ceramics, salts (e.g. LiF), ionic liquids and combinations thereof. Other materials such as silicon as described in WO 2018/170533 may however also be suitable. Ionic liquids (which include salts that are molten only at the maximum operating temperature) are advantageous for their low vapor pressures. The core material is typically a composite (e.g. comprising a salt with a high Cp such a lithium fluoride and a metal alloy with a high heat conductivity). Particularly suitable core materials include aluminum and alloys thereof. An aluminum-silicon alloy is particularly preferred. The origin of the core material is of no particular consequence, but it may for instance for reason of cost efficiency originate from scrap metal as described in WO 2013/029654.

The majority of the heat that is storable in the present apparatus can be stored in the core material. Before this heat can be put to use, it is to be transferred to the HTF in the HTF tank. Means to thermally connect the core material and the HTF may include conductive means (e.g. heat loss via a solid inner wall), convective means (e.g. heat exchangers with a heat transfer fluid, a heat pipe or rods penetrating the inner wall), radiative means (e.g. via a vacuum inner wall) and combinations thereof. Since the core container is at least partially submerged in the HTF, at least part of the heat transfer can be carried out over the inner wall and the principle behind this heat transfer (i.e. conductive, convective and/or radiative) can depend on the structure of the inner part and elements placed therein.

To facilitate heat transfer, the surface area of the inner wall that is in connection with the HTF may be enlarged, for instance by protrusions such as ribs or fins protruding into the HTF and/or the surface may be waffled (as illustrated in FIGS. 7A-7C). The extruding ribs or fins may also connect two or more core containers within a single HTF tank.

In a preferred embodiment, the heat transfer between the core material and the HTF is controllable or switchable such that the rate or power of heat that is transferred to the HTF does not exceed a certain threshold causing safety issues (vide infra). The controllable and switchable nature results in the possibility to also use the inner wall as an active heat conductor and heat insulator besides the inner wall being a physical barrier. Moreover, the switchable transfer allows for a variable extraction of heat from the core depending on the heat demand at the time of extraction. It accordingly allows for actively delivering power and/or storing heat and any heat losses of the core material can be captured and actively used. For instance, when heat demand is high, the heat flow of the core to the HTF can be increased such that sufficient heat can be provided to the HTF. At the other hand, if heat demand is low, the heat flow can be reduced, preferably to a very low amount, such that the heat remains efficiently stored in the core material. Typical convection means to thermally connect the core material and the HTF (e.g. heat exchangers with a heat transfer fluid, heat pipes or rods penetrating the inner wall), may allow for some control and switchability of the heat transfer.

However, in a further preferred embodiment, the core material and HTF are switchably thermally conductively connected. Switchable thermal conductivity can for instance be arranged by including a switchable insulation element as part of the inner thermal insulation wall (22). The advantage of this embodiment is that it allows for effective switchability without occupying space within the apparatus that otherwise could be used to store additional heat. In other words, it allows for a compact provision of switchable insulation.

A particularly suitable and preferred switchable insulation element is for instance a switchable vacuum insulation element (221) as illustrated in FIGS. 2-4. An example of such a suitable switchable vacuum insulation element is described in EP3104099. In a switchable vacuum insulation element according to the invention, the thermal conductivity can be decreased by increasing the pressure and vice versa. The thermal conductivity of the switchable vacuum insulation element can for instance be controlled in the range of 1 mW/m/K to 4000 mW/m/K. It may be appreciated that in certain embodiments, the inner wall comprises essentially on its entire surface that is in contact with the core material the switchable vacuum insulation element.

As further illustrated in FIGS. 2-4, the HTF tank generally comprises an outer thermal insulation wall (11) (herein also referred to as the outer wall) that preferably also comprises a switchable insulation element (221). In typical embodiments, the outer wall essentially entirely surrounds the HTF, though it may be appreciated that the wall may be interrupted by means for operating the apparatus (e.g. wiring or tubing to heat the core material) and the like. Although the temperature of the HTF is lower and the heat stored by the HTF is generally not desirably extracted from the HTF through convection through the wall as is the case for the core material (vide supra), a switchable insulation element such as a second switchable vacuum insulation element (111) may be present in the outer wall for safety reasons. It may be appreciated that during prolonged storage of the heat in the core material and without frequent extraction of heat from the HTF, heat may continue to leak from the core material (despite the insulation properties of the inner wall) such that the temperature of the HTF exceeds a certain threshold (e.g. its boiling point or its pressure). In such a case, the excessive heat may be lost or drained by increasing the thermal conductivity of the outer wall in a manner as described herein-above for the inner wall. As such the excessive heat can be transferred to the environment of the HTF tank.

With respect to the inner wall switchable insulation element, other means to switch the thermal conductivity can also be used in addition or alternatively to the switchable vacuum insulation element. For example, the switchable insulation element or parts thereof may be switchably connected to the inner wall by mechanical or non-mechanical actuation.

In FIG. 5, an example of a switchably connected insulation element as the inner wall switchable insulation element (231) is illustrated. The position of the element with respect to the remaining section of the inner wall (22) that is facing the element, can be expressed as distance 'a' and can be switched by actuation of a mechanical actuation element (232), such as a hydraulic, pneumatic, or motor-based telescopic systems, sliding systems, rotating systems, and pivoting systems to vary the opening angle of the element with respect to the inner wall. The smaller distance 'a', the lower the overall thermal conductivity of the inner wall (22). An example of a similar embodiment is illustrated in FIG. 6, the difference being that the distance 'a' can be switched by actuation of a non-mechanical or solid-state actuation element (233), such as a thermal memory metal (also referred to as shape-memory alloy).

The sensible heat storage apparatus according to the present invention can be suitably used in domestic setting such as domestic hot water and/or for space heating provisions. The HTF may then typically comprise water, alcohols such as glycol, organic or silicon oils, or combinations thereof. A relatively smaller thermal storage unit for a single house can provide enough energy for example for 5 days of hot water demand, a medium unit providing heating demand for a similar time frame. Going further up the scale, a large unit can provide sufficient energy for district heating. In addition, industrial applications such as steam generation can also be feasible with the present apparatus, in which case the HTF can comprise steam. The ratio of HTF to the core material can suitably be varied depending on the intended application. For typical domestic use, the ratio of core material to HTF can be such that the maximum energy density on system level is about 3 GJ/m$^3$ at time of charging and after 7 days of average discharging around 2 GJ/ma. This is significantly higher than conventional hot water storage with about 0.2 GJ/m$^3$ at time of charging and which may theoretically only reach 0.3 GJ/m$^3$.

The heat from the sensible heat storage apparatus according to the present invention can be extracted and put to use, using conventional means connected to a conventional hot water storage to a domestic hot water and/or space heating system. Depending on the volume HTF versus heat extraction (or consumption) of HTF from the apparatus, the HTF (in case it comprises water) can be led through the apparatus as potable water in which case no separate external heat exchange may be required. This can for instance be the preferred embodiment when the apparatus is located in a household and comprises less than 200 L. However, in similar household situations wherein the HTF has a larger volume (e.g. 200 L or more), it may be preferably to transfer the heat from the HTF to the domestic hot water and/or space heating system by a heat exchanger that is thermally connected to the HTF. Accordingly, in a particular embodiment, the sensible heat storage apparatus is further comprising a heat exchanger that is thermally connected to the HTF, which heat exchanger is adapted to be thermally connected to piping of a domestic hot water and/or space heating system. The term 'hot water and/or space heating system' herein encompasses systems for a single house and systems for an entire district.

A further aspect of the present invention is directed to a method for operating the sensible heat storage apparatus for storing heat and providing heat. As described herein above, this method is preferably carried out for providing domestic hot water and/or for space heating.

The method typically comprises various stages: a charging stage, a storage stage and a discharging stage. The charging stage comprises heating the core material with the heater to store the heat therein. As described herein-above in more detail, the heater can heat the core material to a temperature of more than 100° C., preferably more than 150° C., more preferably more than 500° C. more preferred more than 800° C. such as in the range in 900° C. or 1000° C. During the storage stage, the apparatus generally remains idle and the core material maintains the stored heat at a temperature to which the heater has heated the core material (i.e. a temperature of more than 100° C., preferably more than 150° C., more preferably more than 500° C., more preferred more than 800° C. such as in the range in 900° C. or 1000° C.). Any lost heat from the core material is generally captured by the HTF in the HTF tank such that the overall heat loss of the apparatus remains very small to none. The heat loss from the core material to the HTF can be minimized by providing a maximum thermal insulation to the inner wall.

During the discharging stage, the thermal insulation may be reduced by engaging the switchable inner insulation element (e.g. by decreasing the vacuum in the switchable vacuum insulation element, if present). As such, the heat flow rate or power from the core material to the HTF increases and heat is release that can be put into use. As described above, the heat in the HTF may be use directly or indirectly via optionally present additional heat exchangers.

For the purpose of clarity and a concise description features are described herein as part of the same or separate embodiments, however, it will be appreciated that the scope of the invention may include embodiments having combinations of all or some of the features described.

Example 1

A prototype has been constructed to demonstrate the operation and to give some indication of the technical parameters. The constructed demonstration has an inner core (i.e. an inner container) dimension of approximately 30×30× 30 cm filled with carbon steel (i.e. a core material) and electric heating elements. The inner core was constructed of vacuum supported panels with a switching thermal conductivity. The inner core was submerged in a 100 liter flow through water tank (i.e. a HTF tank). A preliminary test was conducted, during the "charging" the carbon steel was heated up to 400° C., then stored, and after some time "discharged". The input power of the heaters was approximately 0.7 kW during the charging. During storage the heat losses from the inner core to the water tank were around 0.3 kW and finally during discharging 2 kW could be transferred from the inner core to the water tank (see FIG. 8). The unit had a total storage capacity of about 14 kWh.

The invention claimed is:

1. A sensible heat storage apparatus comprising
    a heat transfer fluid (HTF) tank comprising an HTF;
    a core container that is adapted to be at least partially submerged in the HTF when the HTF is present within said HTF tank; and
    a heater positioned within the core container;
    wherein said core container is adapted to be at least partially filled with a core material and which comprises an inner thermal insulation wall defining an internal volume of the core container adapted to contain said core material and wherein said sensible heat storage apparatus is adapted such that the core material and the HTF are switchably thermally connected,
    wherein the inner thermal insulation wall comprises a switchable vacuum insulation element of which the thermal conductivity can be controlled in the range of 1 mW/m/K to 4000 mW/m/K by decreasing or increasing a pressure in the switchable vacuum insulation element such that the inner thermal insulation wall can be switched between an active heat conductor and a heat insulator,
    wherein the heater is adapted to heat the core material to a temperature of more than 500° C.,
    wherein the HTF tank comprises an outer thermal insulation wall that is at least partially surrounding the HTF, and
    wherein the HTF is adapted to absorb heat that is lost by heat leakages from the core material when the inner thermal insulation wall functions as a heat insulator to reduce heat loss from the sensible heat storage apparatus.

2. The sensible heat storage apparatus according to claim 1, wherein the core container comprises said core material.

3. The sensible heat storage apparatus according to claim 1, wherein the core material has a volumetric heat capacity of at least 1.5 MJ/K/m$^3$.

4. The sensible heat storage apparatus according to claim 1, wherein the core material has a heat conductivity of at least 10 W/m/K.

5. The sensible heat storage apparatus according to claim 1, wherein the core material has a thermal expansion coefficient of less than $50 \times 10^{-6}$ m/(m·K).

6. The sensible heat storage apparatus according to claim 1, wherein the core material comprises a material selected from the group consisting of metals, metal alloys, metal oxides, metal nitrides, metal carbides, ceramics, salts, ionic liquids and combinations thereof.

7. The sensible heat storage apparatus according to claim 1, that is adapted such that the core material and the HTF are switchably conductively thermally connected.

8. The sensible heat storage apparatus according to claim 1, wherein the ratio of the thermal expansion coefficients of the core material and the inner thermal insulation wall is within the range of 0.25 to 4.

9. The sensible heat storage apparatus according to claim 1, wherein the HTF container comprises an outer thermal insulation outer wall that is at least partially surrounding the HTF.

10. The sensible heat storage apparatus according to claim 1, further comprising a heat exchanger that is thermally connected to the HTF, which heat exchanger is adapted to be thermally connected to piping of a domestic hot water and/or space heating system.

11. A domestic hot water and/or space heating system comprising the sensible heat storage apparatus in accordance with claim 1.

12. A method for operating the sensible heat storage apparatus according to claim 1 for storing heat, said method comprising an optional charging state comprising heating the core material with the heater to store the heat therein to a temperature of more than 100° C., said method further comprising a storage stage wherein the core material maintains the stored heat at the temperature to which the heater has heated the core material.

13. The sensible heat storage apparatus according to claim 1, further comprising an electric heater.

14. The sensible heat storage apparatus according to claim 1, wherein the core material comprises aluminum or an alloy thereof.

15. The sensible heat storage apparatus according to claim 1, wherein the ratio of the thermal expansion coefficients of the core material and the inner thermal insulation wall is in the range of 0.5 to 2.

* * * * *